United States Patent
Sundaramoorthy et al.

(10) Patent No.: US 10,803,011 B2
(45) Date of Patent: Oct. 13, 2020

(54) DYNAMIC DATA MANAGEMENT SYSTEM FOR SELECTIVELY TRANSFERRING DATA FILES

(71) Applicant: Bank of America Corporation, Charlotte, NC (US)

(72) Inventors: Crystal M. Sundaramoorthy, Charlotte, NC (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 255 days.

(21) Appl. No.: 15/975,054

(22) Filed: May 9, 2018

(65) Prior Publication Data

US 2019/0347334 A1 Nov. 14, 2019

(51) Int. Cl.
| | | |
|---|---|---|
| G06F 16/00 | (2019.01) | |
| G06F 16/11 | (2019.01) | |
| G06F 21/62 | (2013.01) | |
| G06N 20/00 | (2019.01) | |
| G06F 16/16 | (2019.01) | |
| G06F 16/182 | (2019.01) | |

(52) U.S. Cl.
CPC ............ *G06F 16/122* (2019.01); *G06F 16/16* (2019.01); *G06F 21/6209* (2013.01); *G06N 20/00* (2019.01); *G06F 16/182* (2019.01)

(58) Field of Classification Search
None
See application file for complete search history.

(56) References Cited

U.S. PATENT DOCUMENTS

| | | | |
|---|---|---|---|
| 722,530 A | 3/1903 | McDermott | |
| 6,151,620 A * | 11/2000 | Madsen | G06F 8/65 |
| | | | 709/204 |
| 8,694,497 B2 | 4/2014 | Bacher et al. | |
| 8,793,285 B2 * | 7/2014 | Han | G06F 40/169 |
| | | | 707/803 |
| 8,825,744 B2 | 9/2014 | Wang et al. | |
| 8,825,955 B2 | 9/2014 | Sleiman et al. | |
| 8,832,162 B2 | 9/2014 | Greenspan et al. | |
| 8,930,655 B2 | 1/2015 | Abzarian et al. | |
| 9,436,400 B2 | 9/2016 | Abzarian et al. | |
| 9,542,495 B2 | 1/2017 | Hanses et al. | |
| 10,275,611 B1 * | 4/2019 | Yu | G06F 21/6227 |

(Continued)

*Primary Examiner* — Bai D Vu
(74) *Attorney, Agent, or Firm* — Banner & Witcoff, Ltd.; Michael A. Springs

(57) ABSTRACT

A dynamic data management system includes a computing platform having at least one processor, a memory, and a communication interface which may receive from a dynamic data management gateway, a data file. The computing platform may retrieve, based on the data file, a data file profile associated with the data file. The computing platform then may identify, based on the data file profile and a machine learning dataset, one or more organization computing systems authorized to receive the data file. The computing platform may establish a connection with the one or more organization computing systems and, while the connection is established, issue a command to transfer the data file to the one or more organization computing systems. The command, when processed by the one or more organization computing systems, causes a notification to be displayed on at least one recipient computing device.

20 Claims, 7 Drawing Sheets

(56) References Cited

U.S. PATENT DOCUMENTS

| | | | |
|---|---|---|---|
| 2006/0159109 A1* | 7/2006 | Lamkin | G11B 27/10 370/401 |
| 2014/0137273 A1* | 5/2014 | Workman | G06F 21/60 726/32 |
| 2014/0280367 A1 | 9/2014 | Bloching et al. | |
| 2014/0379921 A1 | 12/2014 | Morley et al. | |
| 2016/0098574 A1 | 4/2016 | Bargagni | |
| 2016/0219058 A1* | 7/2016 | Kim | H04L 63/10 |
| 2017/0353484 A1* | 12/2017 | Knapp | G06F 21/71 |

\* cited by examiner

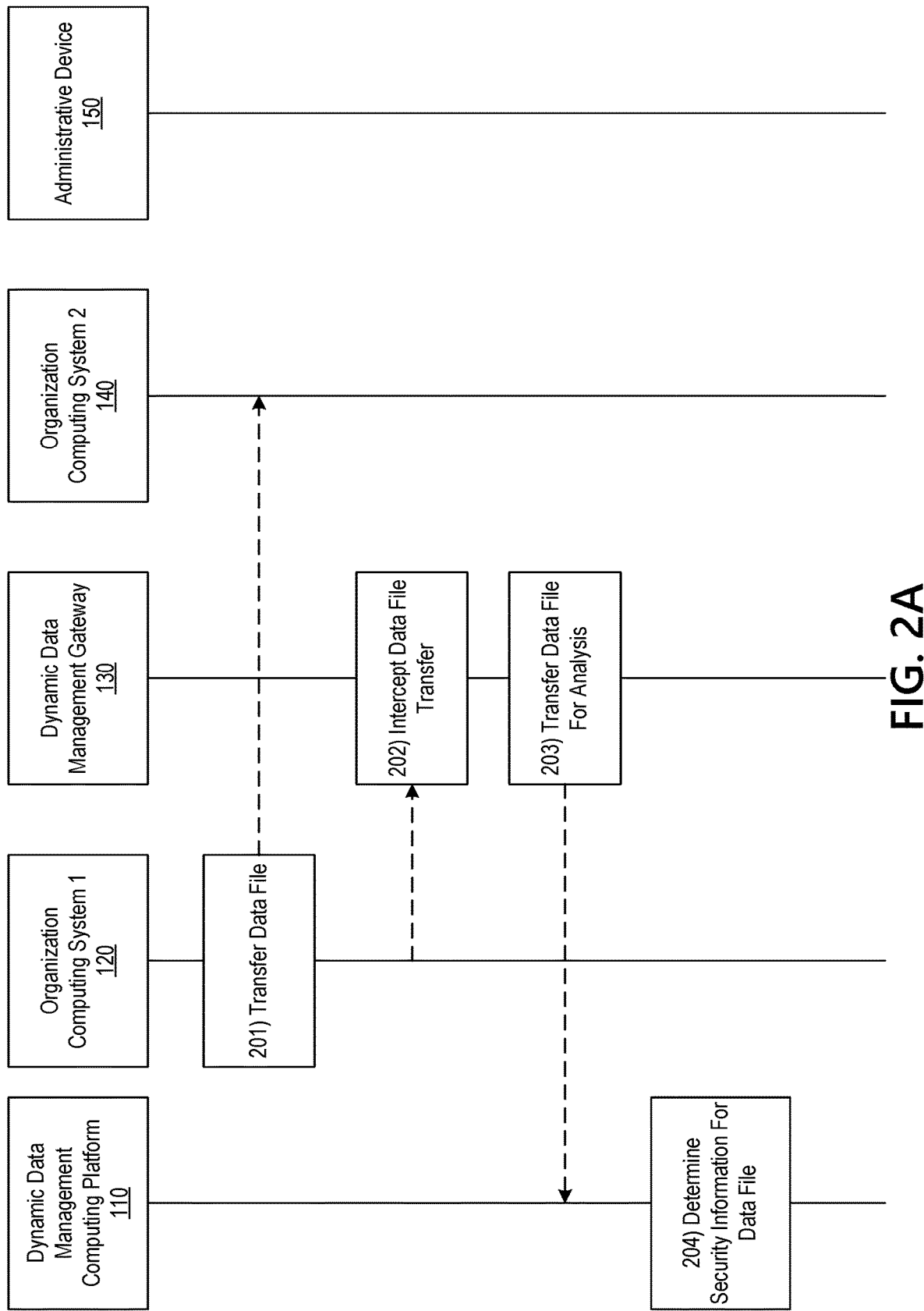

300

Data File Transfer Summary

Data File 1 received from Organization2
Data File 2 received from Organization3
Request for Data File 4 from Organization4 denied: content not included in subscription agreement

Status Report for Data File Transfer

File XXXX transferred from Organization2 to Organization1 on MM-DD-YYYY at XX:XX
File YYYY transferred from Organization3 to Organization1 on MM-DD-YYYY at XX:XX
Request for File ZZZZ from Organization4 to Organization1 on MM-DD-YYYY at XX:XX denied: file transfer not authorized by Organization4

FIG. 4

DYNAMIC DATA MANAGEMENT SYSTEM FOR SELECTIVELY TRANSFERRING DATA FILES

BACKGROUND

Aspects of the disclosure relate to electrical computers, digital processing systems, and multicomputer data transferring. In particular, one or more aspects of the disclosure relate to selectively transferring data files between a plurality of organization computing systems via a dynamic data management system.

Large organizations, such as financial institutions, may maintain a relatively great deal of enterprise information, which may be created, stored, and/or otherwise used in the course of the business of such organizations. For example, a financial institution may maintain customer information (e.g., customer account information, customer preferences information), internal information (e.g., marketing information, strategy information, other types of confidential information), and/or various other types of information.

In some circumstances, an organization may choose to share certain types of enterprise information with one or more external organizations, which sometimes is referred to as business-to-business or "B2B" transfers. The organization transferring the information typically also wants to prevent other types of enterprise information, such as confidential information, from being transferred outside of the organization and/or to unauthorized recipients. In many instances, it may be difficult to provide authorized individuals with reliable, efficient, easy-to-use, and convenient access to enterprise information, while also ensuring that appropriate security is maintained for the enterprise information.

SUMMARY

Aspects of the disclosure provide effective, efficient, scalable, and convenient technical solutions that address and overcome the technical problems associated with transferring data among organization computing systems using a dynamic data management system.

In accordance with one or more embodiments, a computing platform having at least one processor, a memory, and a communication interface may receive, by the at least one processor, via the communication interface, and from a dynamic data management node, a data file. Thereafter, the computing platform may retrieve, based on the data file, a data file profile associated with the data file. The computing platform then may identify, based on the data file profile and a machine learning dataset, one or more organization computing systems that are authorized to receive the data file. The computing platform may establish a connection with the one or more organization computing systems and, while the connection is established, issue a command to transfer the data file to the one or more organization computing systems. The command, when processed by the one or more organization computing systems, causes a notification to be displayed on at least one recipient computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A and 2B depict an illustrative event sequence for transferring data using a dynamic data management system in accordance with one or more example embodiments;

FIGS. 3 and 4 depict example graphical user interfaces for data transfer recipients and administrative computing devices, respectively, in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
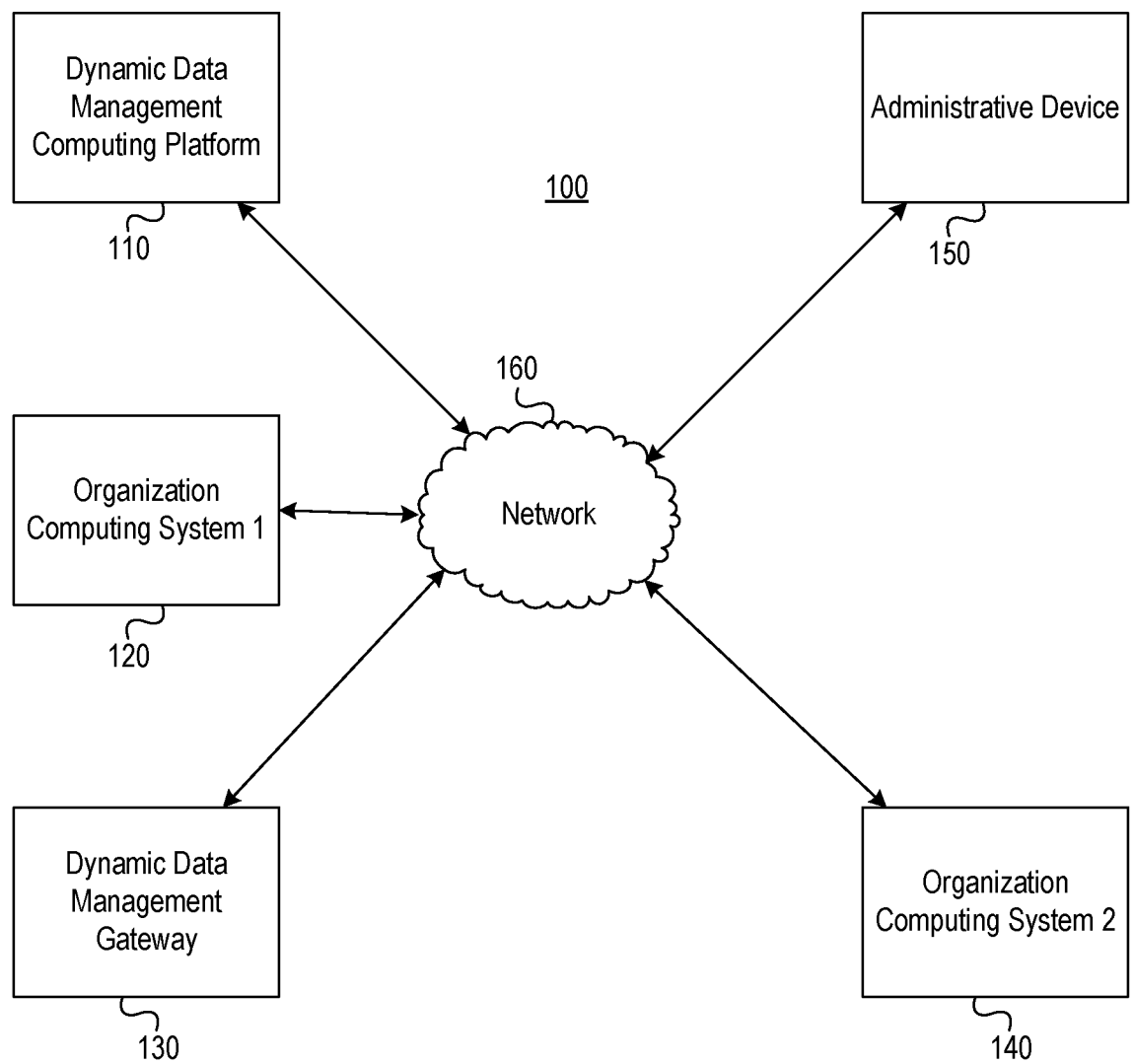
FIGS. 1A and 1B depict an illustrative computing environment for transferring data using a dynamic data management system in accordance with one or more example embodiments.
Figure 1B:
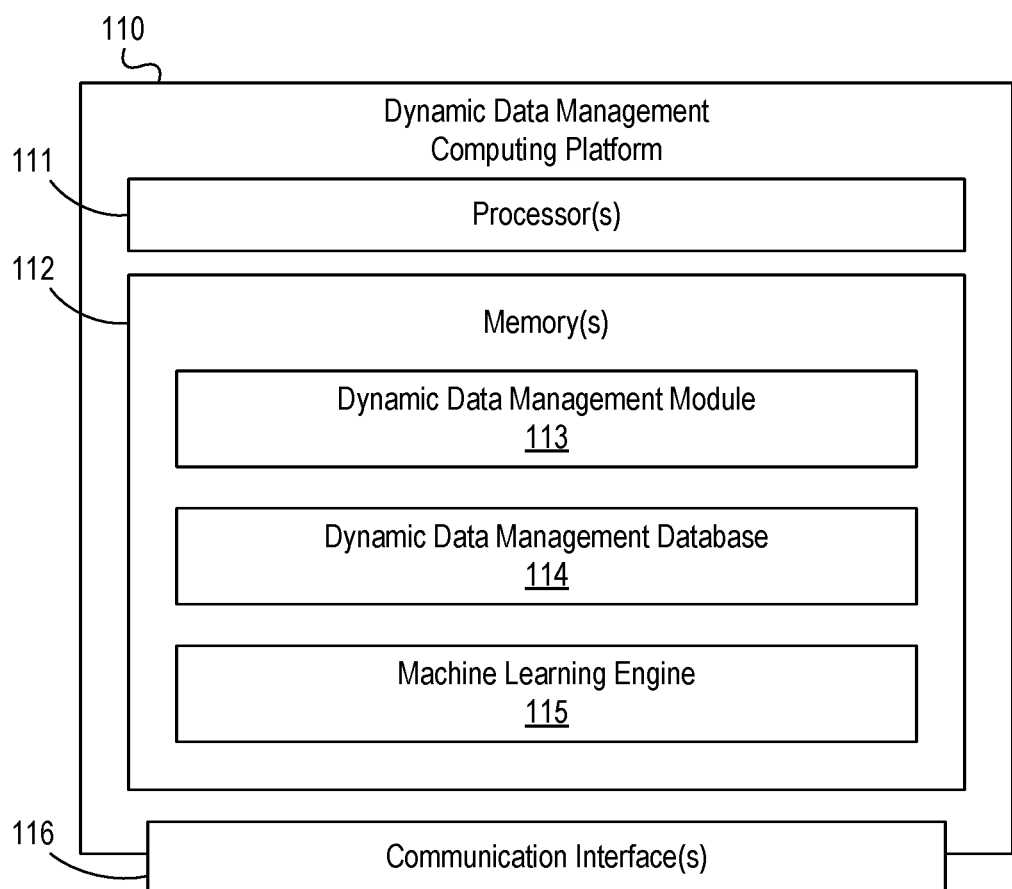

FIGS. 1A and 1B depict an illustrative computing environment 100 for transferring data files using a dynamic data management system in accordance with one or more example embodiments. Referring to FIG. 1A, the computing environment 100 may include one or more computing devices and/or other computer systems. For example, the computing environment 100 may include a dynamic data management platform 110, a first organization computing system 120, a dynamic data management gateway 130, a second organization computing system 140, and an administrative device 150.

The dynamic data management platform 110 may be configured to monitor, control, and/or affect data transfers between systems by controlling and/or directing actions of other devices and/or computer systems, and/or may be configured to perform other functions, as discussed in greater detail below. In some instances, dynamic data management platform 110 may perform and/or provide one or more techniques to monitor, control, and/or affect data transfers between multiple computing systems.

The first organization computing system 120 may be configured to receive and/or transmit data files on behalf of a first enterprise organization. For example, the first organization computing system 120 may be configured to perform one or more functions and/or tasks on behalf of the first enterprise organization. The second organization computing system 140 be configured to receive and/or transmit data files on behalf of a second enterprise organization. For example, the second organization computing system 140 may be configured to perform one or more functions and/or tasks on behalf of the second enterprise organization.

A dynamic data management gateway 130 may be configured to receive, intercept, and/or transmit data files that are transferred or sought to be transferred between multiple different systems. For example, the dynamic data management gateway 130 may be configured to receive, intercept and/or analyze data file transfers from one or more systems of the enterprise organization (e.g., first organization computing system 120 and/or second organization computing system 140). After receiving and/or intercepting the data files, the dynamic data management gateway 130 may transmit the data files to the dynamic data management computing platform 110. Additionally, and/or alternatively, the dynamic data management gateway 130 may be connected to one or more systems of an enterprise organization. For example, the dynamic data management gateway 130 may be a node that is connected to a system, such as the first organization computing system 120. After the first organization computing system 120 transfers a data file, the dynamic data management gateway 130 may intercept the data file. Then, the dynamic data management gateway 130 may transfer the data file to the dynamic data management computing platform 110. In some examples, after the dynamic data management computing platform 110 analyzes the data file, the dynamic data management gateway 130 may receive requests for information, transmit requested information, receive commands, execute the commands, and/or perform other functions, as discussed in greater detail below. In some instances, the dynamic data management gateway 130 might not be another entity, and the functionalities of the dynamic data management gateway 130 may be included within the dynamic data management computing platform 110.

An administrative device 150 may be configured to be used by one or more administrators of computing environment 100. For example, the administrative device 150 may be configured to display, present, and/or otherwise provide one or more user interfaces that enable the one or more administrators to monitor one or more tasks performed by a system of the enterprise organization. The administrative device 150 may receive, from the one or more administrators, user input or selections and send the user input or selections to the dynamic data management computing platform 110 and/or one or more other computer systems and/or devices in computing environment 100. The administrative device 150 may receive, from the dynamic data management computing platform 110 and/or one or more other computer systems and/or devices in computing environment 100, information or data in response to the user input or selection. In some examples, the administrative device 150 may provide the rules for determining whether requested data file transfers are authorized. Such rules may be preset by the participating organization computing systems 120 and 140, and/or modified dynamically by instructions received from the organization computing systems 120 and 140, and/or from other sources such as machine learning engine 115.

The data management computing platform 110 is dynamic insofar as it may respond, in real time, to changing business rules, contracts, regulations, confidentiality designations, and/or other criteria that may be used to determine whether a requested data file transfer is authorized. In some examples, a machine learning engine 115 may assist the data management module 113 in determining whether requested data file transfers are authorized based on, for example, historical activities, business rules, and/or other criteria provided by the participating enterprise organizations computing systems 120 and 140, and/or administrative device 150. In some examples, the machine learning engine 115 may create models and/or assign values or rankings to a plurality of data sources to further develop the artificial intelligence used for managing data file transfers as described herein.

In some examples, if a request for a data file was denied within a specified past period of time (e.g., past week or past month), but subsequent rule changes result in the data file request becoming authorized, the data management computing platform 110 may modify the data file profile accordingly and transmit a notification to an authorized computing device of the requesting party asking whether it still wishes to receive the data file or, alternatively, automatically transfer the data file to the authorized computing device. On the other hand, if rule changes result in a data file previously transferred to a recipient becoming no longer authorized to that recipient, the data management computing platform 110 may modify the data file profile accordingly and block further access to the data file by the requesting party or transmit a command directing the recipient computing device to delete the data file. The data management computing platform 110 also may transmit a notification to the computing device of the requesting party advising that further access to the data file has been blocked or that the file has been deleted, as the case may be.

In one or more arrangements, the first organization computing system 120, dynamic data management gateway 130, second organization computing system 140, and administrative device 150 may be any type of computing device capable of providing a user interface, receiving input via the user interface, and communicating the received input to one or more other computing devices. For example, the first organization computing system 120, dynamic data management gateway 130, second organization computing system 140, and administrative device 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of first organization computing system 120, dynamic data management gateway 130, second organization computing system 140, and administrative device 150 may, in some instances, be special-purpose computing devices configured to perform specific functions.

Computing environment 100 also may include one or more computing platforms. For example, and as noted above, computing environment 100 may include dynamic data management computing platform 110. As illustrated in greater detail below, the dynamic data management computing platform 110 may include one or more computing devices configured to perform one or more of the functions described herein. For example, the dynamic data management computing platform 110 may include one or more computers (e.g., laptop computers, desktop computers, servers, server blades, or the like).

Computing environment 100 also may include one or more networks, which may interconnect one or more of the first organization computing system 120, dynamic data management gateway 130, second organization computing system 140, and administrative device 150. For example, computing environment 100 may include network 160. Network 160 may include one or more sub-networks (e.g., local area networks (LANs), wide area networks (WANs), or the like). For example, network 160 may include a private sub-network that may be associated with a particular organization (e.g., a corporation, financial institution, educational institution, governmental institution, or the like) and that may interconnect one or more computing devices associated with the organization. For example, dynamic data management computing platform 110, first organization computing system 120, dynamic data management gateway 130, second organization computing system 140, and administrative device 150 may be associated with an organization, and a private sub-network included in network 160 and associated with and/or operated by the organization may include one or more networks (e.g., LANs, WANs, virtual private networks (VPNs), or the like) that interconnect dynamic data management computing platform 110, first organization computing system 120, dynamic data management gateway 130, second organization computing system 140, and administrative device 150. Network 160 also may include a public sub-network that may connect the private sub-network and/or one or more computing devices connected thereto (e.g., dynamic data management computing platform 110, first organization computing system 120, dynamic data management gateway 130, second organization computing system 140, and administrative device 150) with one or more networks and/or computing devices that are not associated with the organization.

Referring to FIG. 1B, dynamic data management computing platform 110 may include one or more processors 111, memory 112, and communication interface 116. A data bus may interconnect processor(s) 111, memory 112, and communication interface 116. Communication interface 116 may be a network interface configured to support communication between dynamic data management computing platform 110 and one or more networks (e.g., network 160). Memory 112 may include one or more program modules having instructions that when executed by processor(s) 111 cause the dynamic data management computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of the dynamic data management computing platform 110 and/or by different computing devices that may form and/or otherwise make up the dynamic data management computing platform 110. For example, memory 112 may have, store, and/or include a dynamic data management module 113, a dynamic data management database 114, and a machine learning engine 115. Dynamic data management module 113 may have instructions that direct and/or cause dynamic data management computing platform 110 to analyze data transfers between systems, as discussed in greater detail below. Dynamic data management database 114 may store information used by the dynamic data management module 113 and/or the dynamic data management computing platform 110 in analyzing data transfers between systems and/or in performing other functions. Machine learning engine 115 may have instructions that direct and/or cause the dynamic data management computing platform 110 to set, define, and/or iteratively redefine optimization rules, techniques and/or other parameters used by dynamic data management computing platform 110 and/or other systems in computing environment 100.

Figure 1C:
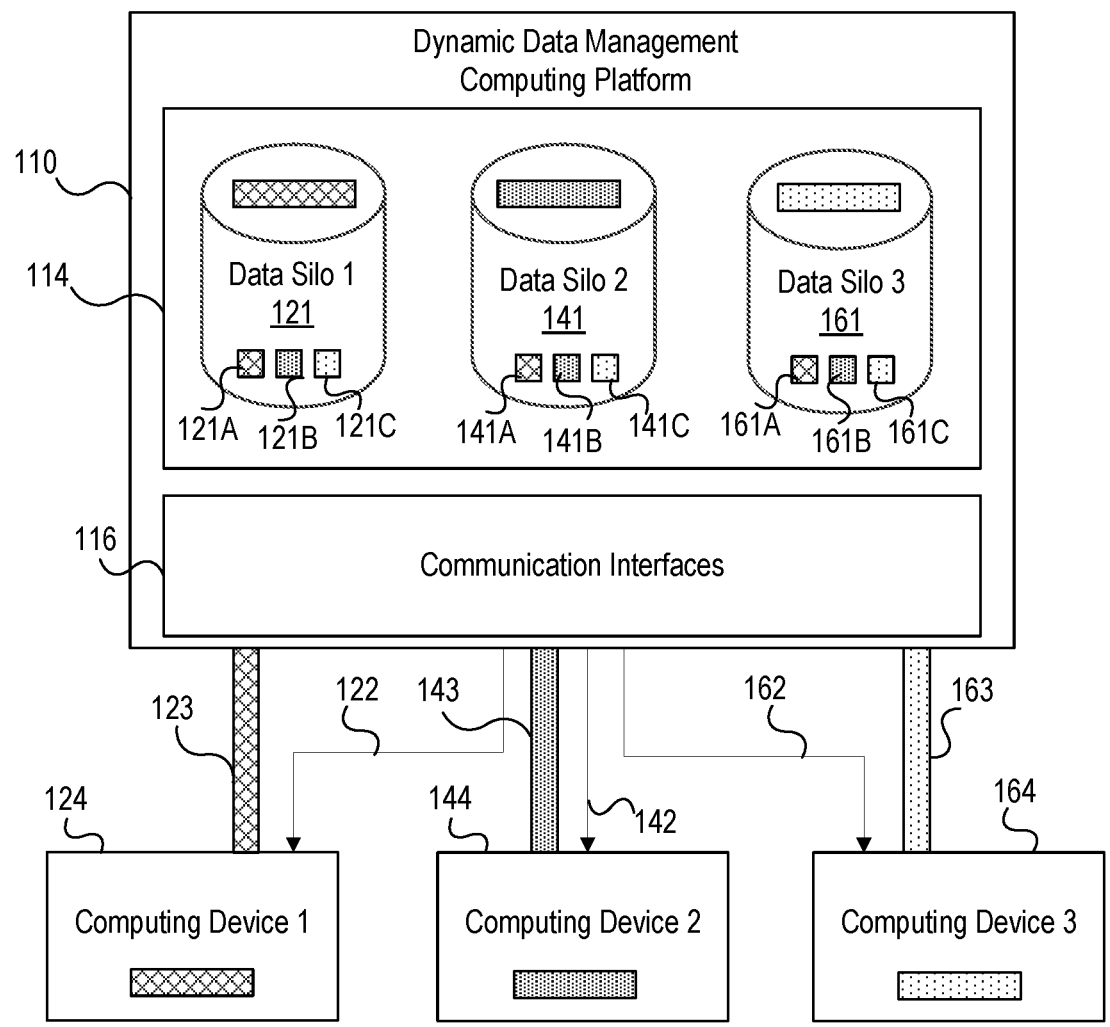
FIG. 1C depicts an illustrative dynamic data management database featuring data silos in accordance with one or more example embodiments.

FIG. 1C schematically illustrates an example of a dynamic data management database 114 in which data is housed in data silos 121, 141, and 161 which, for example, may be maintained and/or controlled by respective enterprise organizations. The data silos may include traditional (e.g., networked) databases, unstructured types of data storage (e.g., cloud), data centers, or any combination thereof. As shown schematically in FIG. 1C, the first data silo 121 may be maintained and/or controlled by a first enterprise organization and may host data files 121A of the first enterprise organization, as well as data files 121B of a second enterprise organization and data files 121C of a third enterprise organization. The second data silo 141 may be maintained and/or controlled by the second enterprise organization and may host data files 141B of the second enterprise organization, as well as data files 141A of the first enterprise organization and data files 141C of the third enterprise organization. Similarly, the third data silo 161 may be maintained and/or controlled by the third enterprise organization and may host data files 161C of the third enterprise organization, as well as data files 141A of the first enterprise organization and data files 141B of the second enterprise organization. Such a data silo arrangement may allow one enterprise organization to "rent" unused data storage capacity to another organization, resulting in a more efficient use of resources among the plurality of organizations. As illustrated in FIG. 1C, the data files may be tagged or mapped so that, for example, upon the sale of the business of an enterprise organization, the acquiring entity may easily be given appropriate access to the data files of the acquired organization. The tags (e.g., data file profiles) may effectively create virtual databases when the data silos 121, 141, and 161 are composed of otherwise unstructured data.

The dynamic data management computing platform 110, upon receiving a data file transfer request from an enterprise organization user, may identify enterprise organization(s) (and/or division(s) thereof) that are authorized to receive the requested data file. The dynamic data management computing platform 100 thereafter may establish a connection with an organization computing systems (e.g., via network 160 as previously described), such as a computing device 124, 144, or 164 which is maintained and/or controlled by the first enterprise organization, the second enterprise organization, or the third enterprise organization, respectively, and transfer the authorized data file(s). As shown schematically in FIG. 1C, dynamic data management computing platform 110 may transfer to a first computing device 124 maintained and/or controlled by the first enterprise organization, data files of the first enterprise organization (via 123) and also data files of the second and third enterprise organizations (via 122) that the user of the first computing device 124 is authorized to receive. The dynamic data management computing platform 110 may transfer to a second computing device 144 maintained and/or controlled by the second enterprise organization, data files of the second enterprise organization (via 143) and also data files of the first and third enterprise organizations (via 142) that the user of the second computing device 144 is authorized to receive. In an analogous manner, the dynamic data management computing platform 110 may transfer to a third computing device 164 maintained and/or controlled by the third enterprise organization, data files of the third enterprise organization (via 163) and also data files of the first and second enterprise organizations (via 162) that the user of the third computing device 164 is authorized to receive.

Figure 2B:
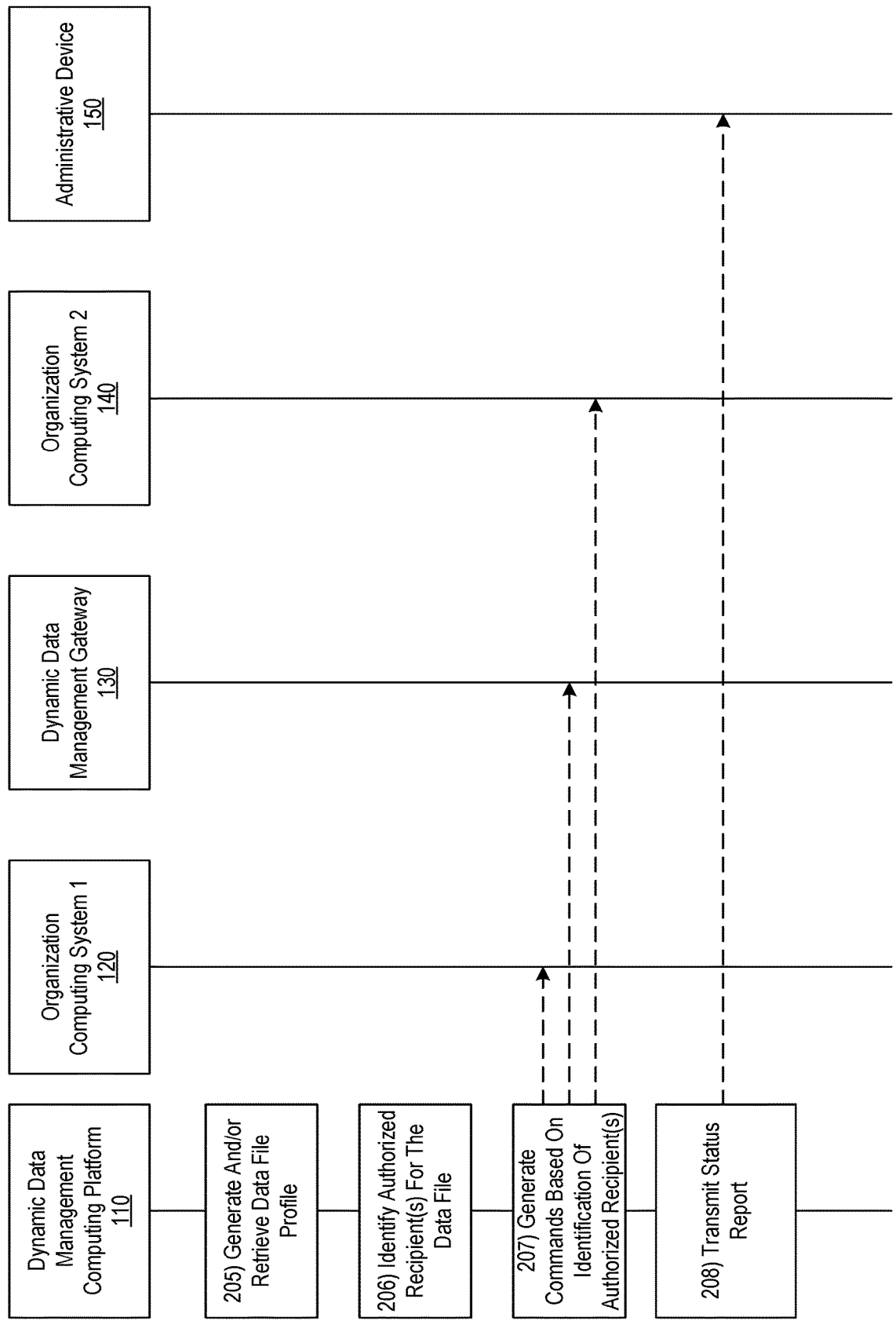

FIGS. 2A and 2B depict an illustrative event sequence for transferring data using a dynamic data management system in accordance with one or more example embodiments.

Referring to FIG. 2A, at step 201, the first organization computing system 120 may transmit one or more data files to another system, such as the second organization computing system 140. For example, the first organization computing system 120 may perform one or more assigned tasks for the first enterprise organization. At step 201, the first organization computing system 120 may perform a step of the task by transmitting the data file to the second organization computing system 140.

At step 202, dynamic data management gateway 130 may intercept the data file transfer. For example, the dynamic data management gateway 130 may be connected, attached, and/or otherwise in communication with the first organization computing system 120. When the first organization computing system 120 transmits one or more data files, the dynamic data management gateway 130 may intercept the data file transfer. Thus, prior to the second organization computing system 140 receiving the data file, the dynamic data management gateway 130 may intercept the data file. In some embodiments, the first organization computing system 120 may transmit the data file directly to the dynamic data management gateway 130.

In some examples, a plurality of dynamic data management gateways 130 may be connected to a plurality of different systems within the enterprise organization. Each dynamic data management gateway 130 may intercept and/or receive data file transfers for one or more systems within the enterprise organization. Further, in some instances, the dynamic data management gateway 130 may be a portable computing device and/or a node that may be connected to a system of the enterprise organization (e.g., first organization computing system 120). In such instances, the dynamic data management gateway 130 may be plugged in or attached to the system. After plugging in or attaching to the system, the dynamic data management gateway 130 may intercept communications (e.g., data file transfers) between the attached system and one or more other systems in the enterprise organization.

At step 203, dynamic data management gateway 130 may transfer the data file for security analysis. For example, the dynamic data management gateway 130 may transfer the data file to the dynamic data management computing platform 110. At step 204, after the dynamic data management computing platform 110 receives the transferred data file, the dynamic data management computing platform 110 may determine security information associated with the data file. The security information may correspond to characteristics and/or properties of the data file, such as an identification of other enterprise organization(s) with whom the data file is authorized to be shared, and/or other attributes associated with the data file from which a security determination may be made.

In some examples, the dynamic data management computing platform 110 may determine security information corresponding to a particular data file, such as a data file identifier and/or a unique data file profile (e.g., "tag"). Additionally, and/or alternatively, the dynamic data management computing platform 110 may determine security information corresponding to the system transferring the data file (e.g., the first organization computing system 120), the system receiving the data file (e.g., the second organization computing system 140), and/or the task being performed by the systems (e.g., the task being performed by the first organization computing system 120 and the second organization computing system 140).

In some examples, a data file profile (e.g., "tag") is generated on-demand, e.g., upon receipt of a data transfer request. For example, certain data may be stored in an unstructured environment up until such time that a data transfer requested is received. Upon receipt of a data transfer request, the dynamic data management computing platform 110 may identify data within the computing environment 100 that is relevant to the request and identify any enterprise organization(s) with whom the data is authorized to be shared, and then generate data file profile(s) to organize ("tag") the relevant data files to facilitate their subsequent transfer to authorized enterprise organization(s).

Referring to FIG. 2B, at step 205, dynamic data management computing platform 110 may retrieve, from the dynamic data management database 114, a data file profile associated with the security information determined at step 204. For example, based on similar characteristics, properties, systems (e.g., first organization computing system 120 and/or second organization computing system 140), identifiers, and/or other identification information described at step 204, the dynamic data management computing platform 110 may retrieve a data file profile associated with the data file. The data file profile may include similar characteristics, properties, attributes, and/or profiles associated with previously received data files. For example, the dynamic data management computing platform 110 may identify transactions indicating a particular project. The dynamic data management computing platform 110 may determine characteristics, properties, attributes, and/or profiles associated with previous data files indicating the particular project. Additionally, and/or alternatively, the dynamic data management computing platform 110 may identify a data file profile that matches the previous data file. For instance, the security information may identify a user account. The dynamic data management computing platform 110 may retrieve previous data files associated with the user account.

In some instances, the data file profile may indicate previous historical information for the previous data files. The previous historical information may correspond to a data file size, content (e.g., transactions) associated with the previous data files, a time the previous data files were transmitted and/or received, parts of the previous data file (e.g., different sections, transactions, and/or topics), and/or priorities for different parts of the previous data file. Additionally, and/or alternatively, the previous historical information may indicate different parts (e.g., fifty transactions) and/or priorities (e.g., different priorities for each of the fifty transactions) for the previous data files. Further, in some examples, the priorities associated with different parts of the data file may correspond to a data file classification. The data file classification may correspond to a classification of different parts, sections, and/or transactions for the data file (e.g., private, public, and/or confidential).

At step 206, dynamic data management computing platform 110 may identify enterprise organization(s) that are authorized to receive the data file. For example, dynamic data management computing platform 110 may determine, based on the data file profile characteristics, whether an entity requesting the data file, e.g., first organization computing system 120 or second organization computing system 140, is authorized to receive the data file. The dynamic data management computing platform 110 also may determine whether a data file, even if not specifically requested by an enterprise organization, may be relevant to the activities of an enterprise organization(s) and, if so, whether the enterprise organization(s) is authorized to receive the data file. For example, the dynamic data management computing platform 110 may determine, based on the data file profile, that the data file may be relevant to an enterprise organization's activities based on known attributes of the organization, e.g., through identification of common user accounts or the like.

At step 207, dynamic data management computing platform 110 may generate one or more commands based on the identification of enterprise organization(s) authorized to receive the data file. For example, the dynamic data management computing platform 110 may generate one or more commands directing a computing device (e.g., the first organization computing system 120 and/or the dynamic data management gateway 130) to transmit and/or re-transmit the data file to the receiving entity, e.g., second organization computing system 140. The dynamic data management computing platform 110 may generate one or more commands directing the first organization computing system 120 to transmit the data file to the intended second organization computing system 140. Additionally, and/or alternatively, the dynamic data management computing platform 110 may generate one or more commands directing an unauthorized second organization computing system 140 to delete the data file, if previously transmitted. For example, the data file may include private and/or confidential information (e.g., determined from the data classification). The dynamic data management computing platform 110 may generate one or more commands directing the incorrect second organization computing system 140 to delete the private and/or confidential information.

In some examples, the first organization computing system 120 might not have transferred the data file within the determined time range. For example, the first organization computing system 120 and/or the dynamic data management gateway might not have transferred the data file due to network errors. As such, the dynamic data management computing platform 110 may generate one or more commands for the first organization computing system 120 to transmit and/or re-transmit the data file to the second organization computing system 140. The dynamic data management gateway 130 may continue to monitor the transfer and/or re-transfer of the data file from the first organization computing system 120 to the second organization computing system 140.

At step 208, the dynamic data management computing platform 110 may transmit feedback to an administrative device 150. The feedback may indicate, for example, that the first organization computing system 120 and/or the dynamic data management gateway 130 may have crashed. In some instances, the first organization computing system 120 may receive and/or execute the one or more commands (e.g., transfer and/or re-transfer the data file to the second organization computing system 140). Additionally, and/or alternatively, the dynamic data management gateway 130 may receive the one or more generated commands. In some examples, the dynamic data management gateway 130 may forward the one or more generated commands to the first organization computing system 120. Further, in some embodiments, the dynamic data management gateway 130 may have intercepted the data file at step 202. And, at step 208, based on the one or more generated commands, the dynamic data management gateway 130 may transmit or forward the data file to the correct second organization computing system 140.

After transmitting the status report at step 208, an administrator may determine the current data file's transactions are correct. Then, using administrative device 150, the administrator may transmit a response to update the data file profile based on the current data file. In some embodiments, the dynamic data management computing platform 110 may continuously monitor a plurality of data files for the data file profile. After receiving each data file, including the data files containing one or more errors, the dynamic data management computing platform 110 may use the machine learning engine 115 to set, define, and/or iteratively redefine optimization rules, techniques and/or other parameters used by dynamic data management computing platform 110 and/or other systems in computing environment 100 to update the data file profile.

FIGS. 3 and 4 show examples of user interfaces 300 and 400, respectively. FIG. 3 shows an example of a user interface 300 advising a recipient of data files that requests for data files from two outside organizations were successful, but that a third request was denied because the custodian of the data did not authorize the transfer. FIG. 4 shows an example of a user interface 400 for an administrative computing device providing a report of files transferred. The report may, for example, indicate files transferred over a given period of time (daily, weekly, biweekly, and so forth) and may indicate both files that were successfully transferred and any file transfer requests that were not authorized or were not completed due to technical difficulties.

Figure 5:
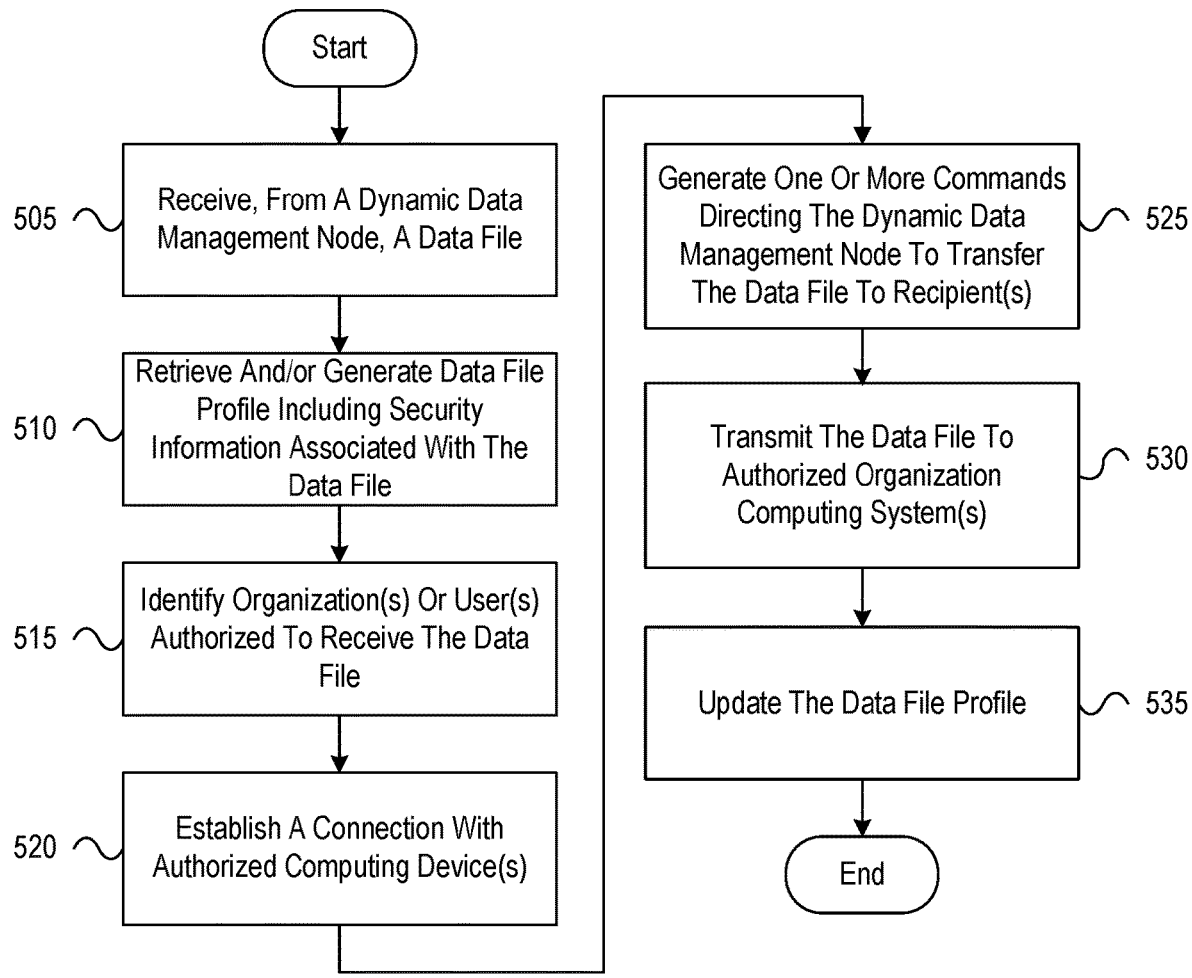
FIG. 5 depicts an illustrative method for transferring data using a dynamic data management system in accordance with one or more example embodiments.

FIG. 5 depicts an illustrative method for transferring data using a dynamic data management system in accordance with one or more example embodiments. Referring to FIG. 5, at step 505, a computing platform having at least one processor, a memory, and a communication interface may receive, by the at least one processor, via the communication interface, and from a dynamic data management node, a data file. At step 510, the computing platform may retrieve, based on the data file, a data file profile indicating security information associated with the data file. In some examples, the data file profile may be generated on-demand, e.g., upon receipt of a request for the data file. At step 515, the computing platform may identify, based on the data file profile, one or more organizations or users who are authorized to receive the data file. At step 520, the computing platform may establish a connection with computing device(s) associated with the authorized organization(s) or user(s). At step 525, the computing platform may generate one or more commands directing the dynamic data management node to transfer the data file to the authorized recipient(s). At step 530, the computing platform may transmit, via the communication interface, the data file to the authorized organization computing system(s). At step 535, the computing platform may update, based on the completed transfer(s) of the data file, the data file profile.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A dynamic data management computing platform, comprising:
   at least one processor;
   a communication interface communicatively coupled to the at least one processor; and
   memory storing computer-readable instructions that, when executed by the at least one processor, cause the dynamic data management computing platform to:
   receive, by the at least one processor, via the communication interface, and from a dynamic data management gateway, a data file;
   retrieve, based on the data file, a data file profile associated with the data file;
   establish a first connection with a first organization computing system and, while the first connection is established, receive from the first organization computing system one or more business rules or confidentiality designations associated with the data file;
   dynamically identify, by a data management module, based on the data file profile and a machine learning dataset comprising the business rules or confidentiality designations received from the first organization computing system, whether transfer of the data file to one or more second organization computing systems is authorized; and
   based on identifying that the transfer of the data file to one or more second organization computing systems is authorized, establish a second connection with the one or more second organization computing systems and, while the second connection is established, issue a command to transfer the data file to the one or more second organization computing systems, wherein the command, when processed by the one or more second organization computing systems, causes a notification to be displayed on at least one recipient computing device.

2. The dynamic data management computing platform of claim 1, wherein the memory stores additional computer-readable instructions that, when executed by the at least one processor, further cause the dynamic data management computing platform to:
   identify, based on the data file, a route associated with the data file, wherein the route indicates a first system that transmits the data file and a second system that receives the data file.

3. The dynamic data management computing platform of claim 2, wherein the dynamic data management gateway intercepts the data file in transit from the first system to the second system.

4. The dynamic data management computing platform of claim 1, wherein the memory stores additional computer-readable instructions that, when executed by the at least one processor, further cause the dynamic data management computing platform to:
   establish a third connection with an administrative device and, while the third connection is established, transmit a status report to the administrative device.

5. The dynamic data management computing platform of claim 1, wherein the memory stores additional computer-readable instructions that, when executed by the at least one processor, further cause the dynamic data management computing platform to:
   establish a fourth connection with an administrative device and, while the fourth connection is established, receive information from the administrative device containing additional criteria used for authorizing subsequent file transfers.

6. The dynamic data management computing platform of claim 1, wherein the memory stores additional computer-readable instructions that, when executed by the at least one processor, further cause the dynamic data management computing platform to:
   generate the data file profile after receiving a request for the data file from the one or more second organization computing systems.

7. The dynamic data management computing platform of claim 1, wherein the memory stores additional computer-readable instructions that, when executed by the at least one processor, further cause the dynamic data management computing platform to:
   determine that a data file previously transferred to one or more second organization computing systems is no longer authorized; and
   establish a fifth connection with the one or more second organization computing systems and, while the fifth connection is established, transmit a command for the one or more second organization computing systems to delete or block user access to the data file.

8. A method, comprising:
at a dynamic data management computing platform comprising at least one processor, memory, and a communication interface:
receiving, by the at least one processor, via the communication interface, and from a dynamic data management gateway, a data file;
retrieving, based on the data file, a data file profile associated with the data file;
establishing a first connection with a first organization computing system and, while the first connection is established, receiving from the first organization computing system business rules or confidentiality designations associated with the data file;
dynamically identifying, by a data management module, based on the data file profile and a machine learning dataset comprising the business rules or confidentiality designations received from the first organization computing system, whether transfer of the data file to one or more second organization computing systems is authorized; and
based on identifying that the transfer of the data file to one or more second organization computing systems is authorized, establishing a second connection with the one or more second organization computing systems and, while the second connection is established, issuing a command to transfer the data file to the one or more second organization computing systems, wherein the command, when processed by the one or more second organization computing systems, causes a notification to be displayed on at least one recipient computing device.

9. The method of claim 8, further comprising:
identifying, by the at least one processor, based on the data file, a route associated with the data file, wherein the route indicates a first system that transmits the data file and a second system that receives the data file.

10. The method of claim 9, wherein the dynamic data management gateway intercepts the data file in transit from the first system to the second system.

11. The method of claim 8, further comprising:
establishing, by the at least one processor, a third connection with an administrative device and, while the third connection is established, transmitting a status report to the administrative device.

12. The method of claim 8, further comprising:
establishing, by the at least one processor, a fourth connection with an administrative device and, while the fourth connection is established, receiving information from the administrative device containing additional criteria used for authorizing subsequent file transfers.

13. The method of claim 8, further comprising:
generating, by the at least one processor, the data file profile after receiving a request for the data file from the one or more second organization computing systems.

14. The method of claim 8, further comprising:
determining, by the at least one processor, that a data file previously transferred to one or more second organization computing systems is no longer authorized; and
establishing a fifth connection with the one or more second organization computing systems and, while the fifth connection is established, transmitting a command for the one or more second organization computing systems to delete or block user access to the data file.

15. One or more non-transitory computer-readable media storing instructions that, when executed by a dynamic data management computing platform comprising at least one processor, memory, and a communication interface, cause the dynamic data management computing platform to:
receive, by the at least one processor, via the communication interface, and from a dynamic data management gateway, a data file;
retrieve, based on the data file, a data file profile associated with the data file;
establish a first connection with a first organization computing system and, while the first connection is established, receive from the first organization computing system business rules or confidentiality designations associated with the data file;
dynamically identify, by a data management module, based on the data file profile and a machine learning dataset comprising the business rules or confidentiality designations received from the first organization computing system, whether transfer of the data file to one or more second organization computing systems is authorized; and
based on identifying that the transfer of the data file to one or more second organization computing systems is authorized, establish a second connection with the one or more second organization computing systems and, while the second connection is established, issue a command to transfer the data file to the one or more second organization computing systems, wherein the command, when processed by the one or more second organization computing systems, causes a notification to be displayed on at least one recipient computing device.

16. The non-transitory computer-readable media of claim 15 which stores additional instructions that, when executed by the dynamic data management computing platform, cause the dynamic data management computing platform to:
identify, based on the data file, a route associated with the data file, wherein the route indicates a first system that transmits the data file and a second system that receives the data file.

17. The non-transitory computer-readable media of claim 16 wherein the dynamic data management gateway intercepts the data file in transit from the first system to the second system.

18. The non-transitory computer-readable media of claim 15 which stores additional instructions that, when executed by the dynamic data management computing platform, cause the dynamic data management computing platform to:
establish a third connection with an administrative device and, while the third connection is established, transmit a status report to the administrative device.

19. The non-transitory computer-readable media of claim 18 which stores additional instructions that, when executed by the dynamic data management computing platform, cause the dynamic data management computing platform to:
establish a fourth connection with an administrative device and, while the fourth connection is established, receive information from the administrative device containing additional criteria used for authorizing subsequent file transfers.

20. The non-transitory computer-readable media of claim 15 which stores additional instructions that, when executed by the dynamic data management computing platform, cause the dynamic data management computing platform to:
generate the data file profile after receiving a request for the data file from the one or more second organization computing systems.

* * * * *